United States Patent
Yamauchi

(10) Patent No.: US 9,028,074 B2
(45) Date of Patent: *May 12, 2015

(54) IMAGE DISPLAY SYSTEM AND CONTROL APPARATUS

(75) Inventor: Taisuke Yamauchi, Matsumoto (JP)

(73) Assignee: Seiko Epson Corporation (JP)

( * ) Notice: Subject to any disclaimer, the term of this patent is extended or adjusted under 35 U.S.C. 154(b) by 174 days.

This patent is subject to a terminal disclaimer.

(21) Appl. No.: 13/612,935

(22) Filed: Sep. 13, 2012

(65) Prior Publication Data

US 2013/0083090 A1    Apr. 4, 2013

(30) Foreign Application Priority Data

Sep. 30, 2011    (JP) .................................. 2011-218330

(51) Int. Cl.
| | |
|---|---|
| *G03B 21/14* | (2006.01) |
| *G03B 21/62* | (2014.01) |
| *G09G 3/00* | (2006.01) |
| *G03B 21/56* | (2006.01) |
| *H04N 9/31* | (2006.01) |
| *G09G 3/36* | (2006.01) |

(52) U.S. Cl.
CPC ................ *G03B 21/62* (2013.01); *G09G 3/002* (2013.01); *G09G 3/36* (2013.01); *G09G 2300/023* (2013.01); *G09G 2320/0238* (2013.01); *G09G 2320/0646* (2013.01); *G09G 2320/066* (2013.01); *G09G 2360/16* (2013.01); *G03B 21/56* (2013.01); *H04N 9/3182* (2013.01)

(58) Field of Classification Search
CPC .............. H04N 9/3105; H04N 9/3197; H04N 13/0454; G02B 27/145; G02B 27/225; G02B 27/2214

USPC ........... 353/30, 37, 38, 71, 72, 74, 75, 99, 94, 353/98, 119, 79, 85; 359/443, 446, 449, 359/452–553, 272; 349/5, 7, 8, 10, 86; 345/7, 8, 9, 87

See application file for complete search history.

(56) References Cited

U.S. PATENT DOCUMENTS

| | | | |
|---|---|---|---|
| 5,296,952 A | | 3/1994 | Takatsu et al. |
| 5,760,875 A | * | 6/1998 | Daijogo et al. ................. 353/31 |
| 6,351,298 B1 | | 2/2002 | Mitsui et al. |
| 7,336,289 B2 | | 2/2008 | Ishikawa et al. |

(Continued)

FOREIGN PATENT DOCUMENTS

| | | |
|---|---|---|
| JP | 06-082748 | 3/1994 |
| JP | 10-036317 | 2/1998 |

(Continued)

*Primary Examiner* — Sultan Chowdhury
(74) *Attorney, Agent, or Firm* — Harness, Dickey & Pierce, Pierce, P.L.C.

(57) ABSTRACT

An image display system includes a screen capable of switching a state thereof between a scatter state in which the screen scatters light and a transmission state in which the screen transmits light by changing the magnitude of a voltage applied to the screen, a projector that projects video image light modulated in accordance with an image signal on the screen to display an image on the screen, and a controller that controls operation of driving the screen and the projector, wherein the controller instructs the projector to project the video image light on the screen that operates in the scatter state and instructs the screen to change the degree of light scattering in the scatter state in accordance with a luminance level of the image displayed on the screen.

17 Claims, 11 Drawing Sheets

(56) References Cited

U.S. PATENT DOCUMENTS

| | | | |
|---|---|---|---|
| 7,623,203 B2 | 11/2009 | Hayashi et al. | |
| 7,850,304 B2* | 12/2010 | Jacobs et al. | 351/159.6 |
| 8,408,720 B2* | 4/2013 | Nishigaki et al. | 353/94 |
| 8,870,381 B2* | 10/2014 | Freeman et al. | 353/8 |
| 2004/0160538 A1 | 8/2004 | Li et al. | |
| 2005/0259193 A1 | 11/2005 | Sumiyoshi et al. | |
| 2007/0091434 A1* | 4/2007 | Garner et al. | 359/459 |
| 2008/0094551 A1* | 4/2008 | Hayashi et al. | 349/106 |
| 2009/0167966 A1* | 7/2009 | Nam et al. | 349/5 |
| 2010/0014319 A1 | 1/2010 | Oversluizen et al. | |
| 2011/0069242 A1* | 3/2011 | Mashitani et al. | 349/5 |

FOREIGN PATENT DOCUMENTS

| | | |
|---|---|---|
| JP | 2008-102341 A | 5/2008 |
| WO | WO 2004/021079 | 3/2004 |

* cited by examiner

IMAGE DISPLAY SYSTEM AND CONTROL APPARATUS

BACKGROUND

1. Technical Field

The present invention relates to an image display system and a control apparatus.

2. Related Art

There have been known technologies for displaying video images from a projector or any other apparatus on a screen. In recent years, there has been a proposed technology for displaying video images by using a screen capable of switching its state between a transmission (transparent) state and a scatter state and projecting video image light on the screen that operates in the scatter state. Using the technology to set the screen to be transparent when no video image is projected reduces a feeling of spatial oppression produced by the screen not in use. A screen capable of switching its state between the transmission (transparent) state and the scatter state by using a liquid crystal layer has been proposed (JP-A-6-82748, for example) as an example of the screen described above.

As the technology for switching the state of a screen between the transmission (transparent) state and the scatter state by using the liquid crystal layer, there is a known polymer dispersion liquid crystal display apparatus in which a liquid crystal material is dispersed in a polymer (JP-A-10-36317, for example). The principle according to which a polymer dispersion liquid crystal display apparatus of this type operates uses the difference in refractive index between the liquid crystal material and the polymer. In a normal mode, the transmission state is created by applying an electric field, and the scatter state is created by removing the electric field. In a reverse mode, the transmission state is created by applying no electric field, and the scatter state is created by applying the electric field.

When the polymer dispersion liquid crystal display apparatus is used as a screen, and video image light is projected on the screen that operates in the scatter state, a desired image is displayed on the screen. In the related art, however, since the degree of light scattering in the scatter state is fixed, in other words, the degree of light scattering produced by the screen is the same for all displayed images, the following problem, for example, occurs.

For example, when a dark image is displayed on the screen set to allow a viewer to clearly view a bright image (with high contrast) by increasing the degree of scatter produced by the screen, the contrast of the dark image greatly lowers due to scattering of external light. Conversely, when a bright image is displayed on the screen set to reduce the effect of external light to clearly display a dark image by reducing the degree of scatter produced by the screen, the contrast of the bright image lowers. Further, since the degree of scatter is small in the latter case, high luminance portions (bright points) produced on the screen make it difficult for the viewer to view the image because it is too bright. In particular, when video images formed of bright images mixed with dark images, such as moving pictures, are displayed, it is difficult for the viewer to view the images.

SUMMARY

An advantage of some aspects of the invention is to provide an image display system and a control apparatus capable of providing excellent display characteristics by changing the degree of scatter produced by a screen in accordance with the luminance level of an image.

An image display system according to an aspect of the invention includes a screen capable of switching a state thereof between a scatter state in which the screen scatters light and a transmission state in which the screen transmits light by changing the magnitude of a voltage applied to the screen, a projector that projects video image light modulated in accordance with an image signal on the screen to display an image on the screen, and a controller that controls operation of driving the screen and the projector, wherein the controller instructs the projector to project the video image light on the screen that operates in the scatter state and instructs the screen to change the degree of light scattering in the scatter state in accordance with a luminance level of the image displayed on the screen.

In the thus configured image display system, the degree of scatter produced by the screen can be set suitably for the image displayed on the screen, whereby the contrast of the image displayed on the screen can be effectively increased.

In the image display system according to the aspect of the invention, it is preferable that the controller reduces the degree of scatter in the scatter state as the luminance level of the image displayed on the screen decreases.

In the thus configured image display system, the amount and hence the effect of scattered external light decreases as an image to be displayed becomes dark. As a result, when a dark image is displayed, decrease in contrast of the image can be reduced. On the other hand, when a bright image is displayed, the degree of scatter can be increased to suppress the decrease in contrast of the image. That is, no matter how bright or dark an image to be displayed is, the degree of scatter produced by the screen can be set suitably for the image, whereby the image can be displayed with high contrast.

In the image display system according to the aspect of the invention, it is preferable that the controller changes the degree of light scattering in such a way that the degree of light scattering in the scatter state is higher than the degree of light scattering in the transmission state.

In the thus configured image display system, even when an image of a low luminance level is displayed, the image can be displayed with high contrast.

In the image display system according to the aspect of the invention, it is preferable that the screen has a display area where the image is displayed and the display area is formed of a plurality of unit areas, and it is also preferable that the controller is capable of changing the degree of scatter in the scatter state in the plurality of unit areas independently of each other.

In the thus configured image display system, the degree of scatter produced by the screen can be controlled on a unit area basis, whereby the contrast of an image displayed on the screen can be more effectively increased.

In the image display system according to the aspect of the invention, it is preferable that the screen includes a pair of substrates and a polymer dispersion liquid crystal layer provided between the pair of substrates and having liquid crystal molecules dispersed in a polymer.

In the thus configured image display system, the screen can be readily configured.

In the image display system according to the aspect of the invention, it is preferable that the screen to which a voltage is applied operates in the scatter state, whereas the screen to which no voltage is applied operates in the transmission state.

The thus configured screen is preferably used in an application in which the period during which an image is displayed on the screen (period during which the screen operates in the scatter state) is shorter than the period during which no image is displayed on the screen (period during which the screen operates in the transmission state).

In the image display system according to the aspect of the invention, it is preferable that the screen to which a voltage is applied operates in the transmission state, whereas the screen to which no voltage is applied operates in the scatter state.

The thus configured screen is preferably used in an application in which the period during which an image is displayed on the screen (period during which the screen operates in the scattered state) is longer than the period during which no image is displayed on the screen (period during which the screen operates in the transmission state).

In the image display system according to the aspect of the invention, it is preferable that the controller instructs the screen to operate in the scatter state in response to outputting the image signal to the projector.

In the thus configured image display system, a feeling of oppression produced by the screen can be reduced when the screen in not in use.

A control apparatus according to another aspect of the invention controls operation of driving a screen capable of switching a state thereof between a scatter state in which the screen scatters light and a transmission state in which the screen transmits light by changing the magnitude of a voltage applied to the screen and operation of driving a projector that projects video image light modulated in accordance with an image signal on the screen to display an image on the screen, and the control apparatus instructs the projector to project the video image light on the screen that operates in the scatter state and instructs the screen to change the degree of light scattering in the scatter state in accordance with a luminance level of the image displayed on the screen.

The thus configured control apparatus allows the degree of scatter produced by the screen to be set suitably for the image displayed on the screen, whereby the contrast of the image displayed on the screen can be effectively increased.

BRIEF DESCRIPTION OF THE DRAWINGS

The invention will be described with reference to the accompanying drawings, wherein like numbers reference like elements.

DESCRIPTION OF EXEMPLARY EMBODIMENTS

Image display systems and control apparatus according to preferable embodiments of the invention will be described below in detail with reference to the drawings.

First Embodiment

Figure 1:
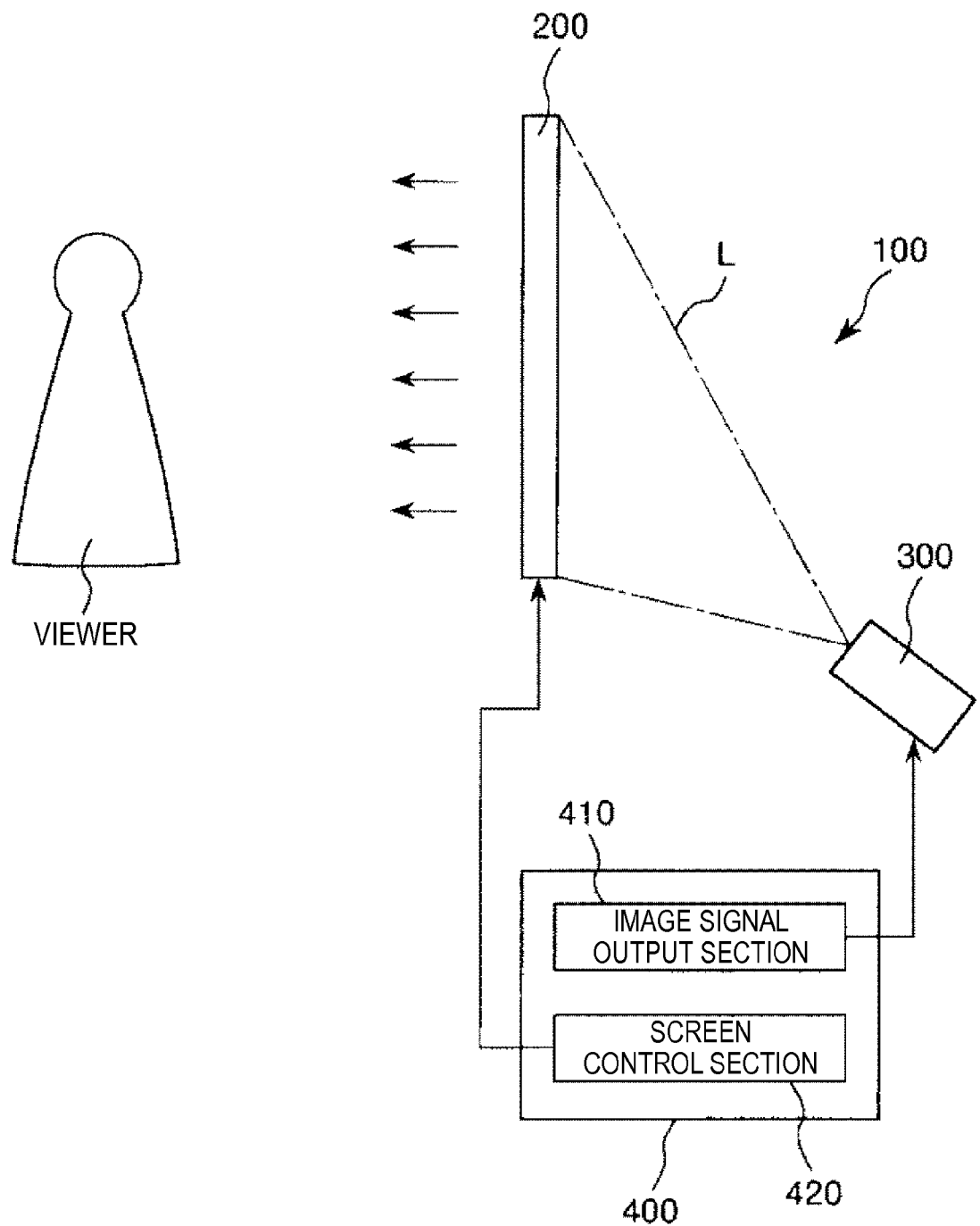
FIG. 1 is a schematic view showing an image display system according to a first embodiment of the invention.
Figure 2:
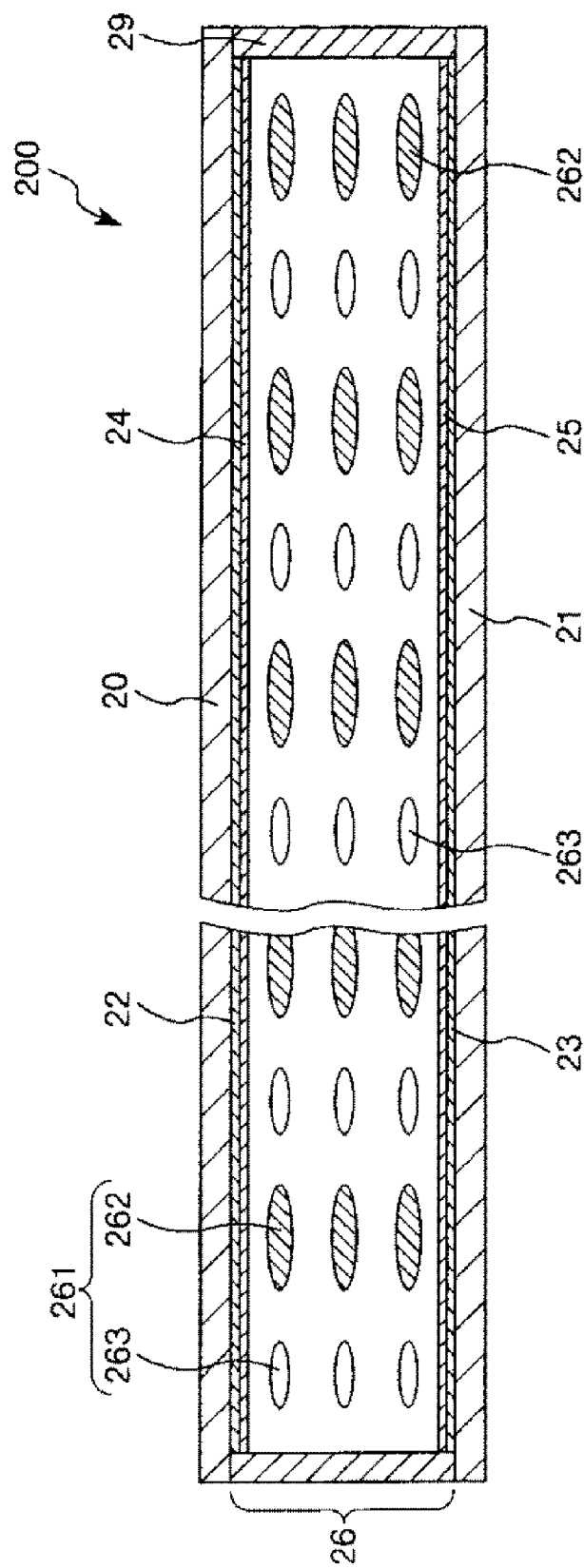
FIG. 2 is a cross-sectional view of a screen shown in FIG. 1.
Figure 3:
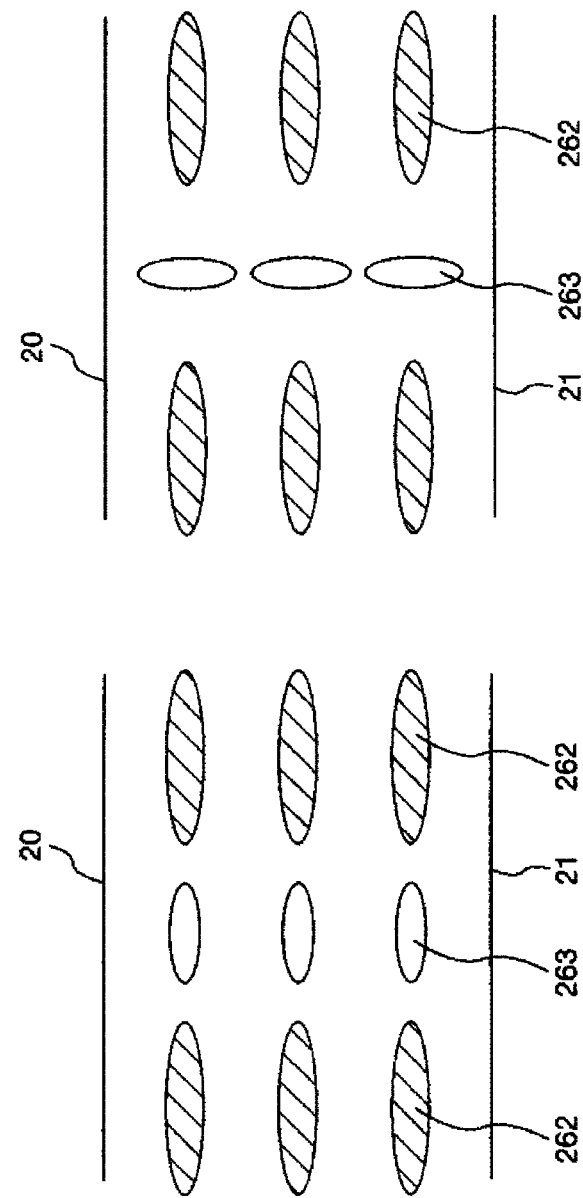
FIGS. 3A and 3B are cross-sectional views for describing the operation of driving the screen shown in FIG. 1.
Figure 4:
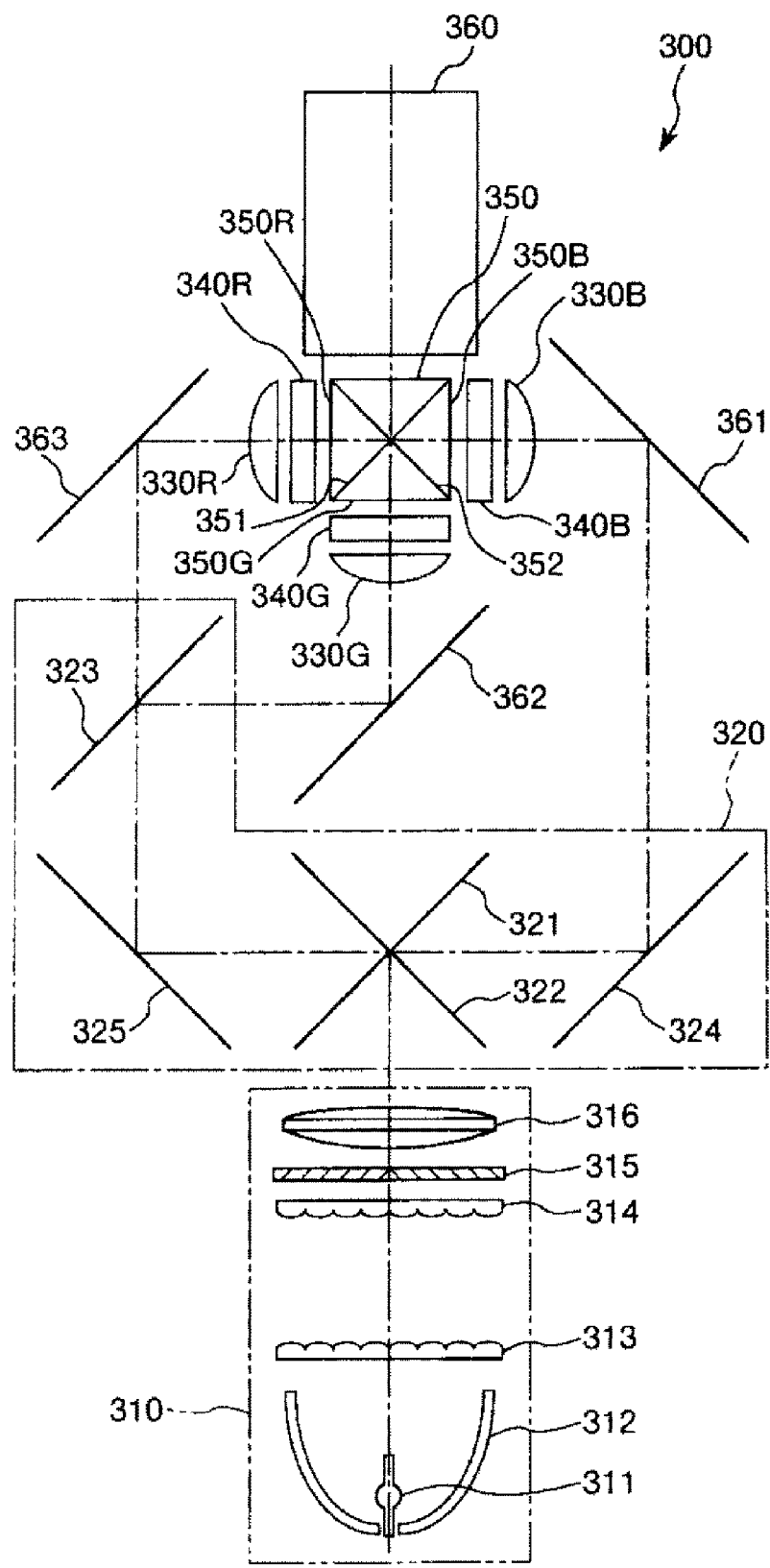
FIG. 4 is a plan view showing the configuration of an optical system of a projector that is part of the image display system shown in FIG. 1.
Figure 5:
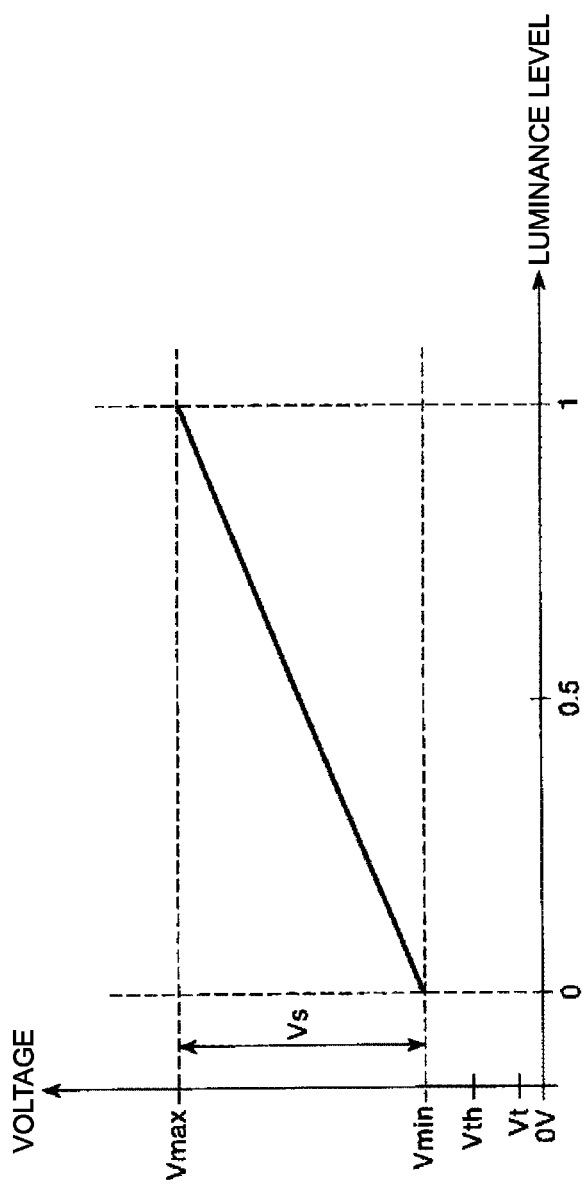
FIG. 5 is a graph showing the relationship between the luminance level of an image displayed on the screen and the magnitude of a voltage applied to the screen.

FIG. 1 is a schematic view showing an image display system according to a first embodiment of the invention. FIG. 2 is a cross-sectional view of a screen shown in FIG. 1. FIGS. 3A and 3B are cross-sectional views for describing the operation of driving the screen shown in FIG. 1. FIG. 4 is a plan view showing the configuration of an optical system of a projector that is part of the image display system shown in FIG. 1. FIG. 5 is a graph showing the relationship between the luminance level of an image displayed on the screen and the magnitude of a voltage applied to the screen. In the following description, the upper side in FIG. 2 is referred to as "upper," and the lower side in FIG. 2 is referred to as "lower" for the convenience of description.

An image display system (image display system according to an embodiment of the invention) 100 includes a screen 200, a projector 300 that displays an image on the screen 200, and a controller (control apparatus according to an embodiment of the invention) 400 that controls the operation of driving the screen 200 and the projector 300, as shown in FIG. 1. The image display system 100 according to the present embodiment employs, but not necessarily, a rear projection method in which video image light is projected on the rear surface of the screen 200 or may alternatively employ a front projection method in which video image light is projected on the front surface of the screen 200.

Screen

The screen 200 is capable of switching its state between a scatter state in which the screen scatters light and a transmission state in which the screen transmits light by changing the magnitude of a voltage applied to the screen 200.

The screen 200 includes a pair of transparent substrates 20 and 21, a pair of transparent electrodes 22 and 23, a pair of orientation films 24 and 25, sealing portions that seal the space between the pair of transparent substrates 20 and 21, and a liquid crystal layer 26 sealed between the pair of transparent substrates 20 and 21, as shown in FIG. 2. The configuration described above readily allows the scatter state and the transmission state to be switched by driving the screen 200 as described below.

The transparent electrode 22 is formed on the lower surface of the transparent substrate 20, and the orientation film 24 is formed on the lower surface of the transparent electrode 22. The transparent electrode 23 is formed on the upper surface of the transparent substrate 21, and the orientation film 25 is formed on the upper surface of the transparent electrode 23.

The transparent substrates 20 and 21 have a function of supporting the transparent electrodes 22 and 23 and the orientation films 24 and 25. The transparent substrates 20 and 21 are made, for example, of, but not necessarily, quartz glass or any other suitable glass material or polyethylene terephthalate or any other suitable plastic material. Among the materials described above, in particular, the quartz glass or any other suitable glass material is preferably used and forms the screen 200 that does not tend to warp, bend, or otherwise deform but excels in stability.

The transparent electrodes 22 and 23 are conductive and made, for example, of an indium tin oxide (ITO), an indium oxide (IO), a tin oxide ($SnO_2$). Each of the orientation films 24 and 25 is, for example, a polyimide film or any other suitable film on which rubbing or any other suitable orientation process is performed.

The liquid crystal layer 26 contains a PDLC (polymer dispersion liquid crystal) material 261, and the state thereof can be switched between a transmission (transparent) state and a scatter state by changing the magnitude of an electric field applied to the liquid crystal layer 26. The PDLC 261 includes polymer portions 262 and liquid crystal portions 263 and can be formed, for example, by mixing a liquid crystalline monomer or any other suitable polymer precursor with a liquid crystal molecule. To form the PDLC 261, the mixture is allowed to undergo an orientation process by using the orientation films 24 and 25 and so irradiated with ultraviolet light or any other form of energy that the liquid crystalline monomer is polymerized. The thus polymerized and oriented liquid crystalline monomer forms the polymer portions 262 having an orientation anchoring force. The liquid crystal molecule is separated from the polymer portions 262 in a phase separation process to form the liquid crystal portions 263, which are oriented by the orientation anchoring force of the polymer portions 262.

The PDLC 261 in the present embodiment is of reverse type, which means that the liquid crystal layer 26 operates in the transmission state, in which the liquid crystal layer 26 is transmissive, in a no voltage applied state in which no voltage is applied between the pair of transparent electrodes 22 and 23, whereas the liquid crystal layer 26 operates in the scatter state, in which the liquid crystal layer 26 is diffusive, in a voltage applied state in which a voltage is applied between the pair of transparent electrodes 22 and 23.

Specifically, in the no voltage applied state, since the liquid crystal portions 263 are oriented in the same direction as the polymer portions 262 as shown in FIG. 3A, the refractive index continuously changes at the boundaries between the liquid crystal portions 263 and the polymer portions 262 (the refractive index of the liquid crystal portions 263 is substantially equal to that of the polymer portions 262) and light incident on the PDLC 261 is hardly diffused but directly exits out thereof or the screen 200 operates in the transmission state. Conversely, in the voltage applied state, the azimuth of polymer molecules in the polymer portions 262 does not change, whereas the azimuth of the liquid crystal molecules in the liquid crystal portions 263 changes in accordance with the electric field as shown in FIG. 3B, whereby the refractive index discontinuously changes at the boundaries between the polymer portions 262 and the liquid crystal portions 263 (the refractive index of the liquid crystal portions 263 is different from that of the polymer portions 262) and the incident light is scattered before it exits out of the PDLC 261 or the screen 200 operates in the light scattered state.

The screen 200, which is capable of switching its state between the transmission state and the scatter state, can be transparent when the screen 200 is not in use and set to operate in the transmission state. A feeling of oppression produced by the screen 200 can therefore be reduced, for example, when the screen 200 is used in a space where a user actually lives.

The degree of light scattering in the scatter state changes with the magnitude of the voltage applied between the transparent electrodes 22 and 23 and increases as the voltage applied between the transparent electrodes 22 and 23 increases.

It is noted that the thus configured screen 200 is preferably used in an application in which the period during which an image is displayed on the screen 200 (period during which the screen 200 operates in the scatter state) is shorter than the period during which no image is displayed on the screen 200 (period during which the screen 200 operates in the transmission state). The screen 200 can thus be driven in a power-saving mode.

Projector

The projector 300 is not limited to a specific one and can be any projector that can display an image on the screen 200. For example, an illumination projection projector that enlarges and projects an image formed by a spatial light modulator on the screen 200 or a scanning projector that scans the screen 200 with light to form an image may be used. An example of the projector 300 will be shown below.

FIG. 4 is a plan view showing the configuration of an optical system of the projector 300. The projector 300 includes an illumination system 310, a color separation system 320, parallelizing lenses 330R, 330G, and 330B, spatial light modulators 340R, 340G, and 340B, and a cross dichroic prism 350, which is a light combiner, as shown in FIG. 4.

The illumination system 310 includes a light source 311, a reflector 312, a first lens array 313, a second lens array 314, a polarization conversion element 315, and a superimposing lens 316.

The light source 311 is an ultra-high pressure mercury lamp, and the reflector 312 is formed of a parabolic mirror. A divergent light flux emitted from the light source 311 is reflected off the reflector 312 and forms a substantially parallelized light flux, which is directed toward the first lens array 313. The light source 311 is not limited to the ultra-high pressure mercury lamp but may alternatively be, for example, a metal halide lamp. Further, the reflector 312 is not limited to the parabolic mirror but may alternatively be an ellipsoidal mirror reflector with a parallelizing concave lens disposed on the side where the light-exiting surface thereof is present.

Each of the first lens array 313 and the second lens array 314 is formed of lenslets arranged in a matrix. The light flux emitted from the light source 311 is divided by the first lens array 313 into a plurality of thin partial light fluxes, which are superimposed on the surfaces of the three spatial light modulators 340R, 340G, and 340B, which are illuminated with the light traveling through the second lens array 314 and the superimposing lens 316.

The polarization conversion element 315 has a function of aligning randomly polarized light fluxes with each other to produce linearly polarized light oscillating in a single direction (S-polarized light or P-polarized light). In the present embodiment, the polarization conversion element 315 produces the S-polarized light because the intensity thereof is not greatly reduced in the color separation system 320.

The color separation system 320 has a function of separating the light flux having exited out of the illumination system 310 (S-polarized light) into red (R), green (G), and blue (B), three color light fluxes. To this end, the color separation system 320 includes a B-light reflecting dichroic mirror 321, an RG-light reflecting dichroic mirror 322, a G-light reflecting dichroic mirror 323, and reflection mirrors 324 and 325.

Among the light fluxes having exited out of the illumination system 310, a B-light component is reflected off the B-light reflecting dichroic mirror 321, further reflected off the reflection mirror 324 and a reflection mirror 361, and reaches the parallelizing lens 330B. On the other hand, among the light fluxes having exited out of the illumination system 310, G-light and R-light components are reflected off the RG-light reflecting dichroic mirror 322, further reflected off the reflection mirror 325, and reaches the G-light reflecting dichroic mirror 323. The G-light component of the light that has reached the G-light reflecting dichroic mirror 323 is reflected off the G-light reflecting dichroic mirror 323 and a reflection mirror 362 and reaches the parallelizing lens 330G, whereas the R-light component of the light that has reached the G-light reflecting dichroic mirror 323 passes through the G-light reflecting dichroic mirror 323, is reflected off a reflection mirror 363, and reaches the parallelizing lens 330R.

The parallelizing lenses 330R, 330G, and 330B are so configured that the plurality of partial light fluxes having exited out of the illumination system 310 are substantially parallelized and illuminate the spatial light modulators 340R, 340G, and 340B in a satisfactory manner.

The R light having passed through the parallelizing lens 330R reaches the spatial light modulator 340R. The G light having passed through the parallelizing lens 330G reaches the spatial light modulator 340G. The B light having passed through the parallelizing lens 330B reaches the spatial light modulator 340B.

The spatial light modulator 340R, which modulates the R light in accordance with an image signal, is a transmissive liquid crystal display device. A liquid crystal panel (not shown) provided in the spatial light modulator 340R includes two transparent substrates and a liquid crystal layer that is sealed therebetween and modulates light in accordance with the image signal. The R light modulated by the spatial light modulator 340R is incident on the cross dichroic prism 350, which is a light combining system. The configuration and function of each of the spatial light modulators 340G and 340B are the same as those of the spatial light modulator 340R.

The cross dichroic prism 350 is formed by bonding four triangular prisms into a rectangular column having a substantially square cross-sectional shape, and dielectric multilayer films 351 and 352 are formed along the X-shaped bonded surfaces. The dielectric multilayer film 351 transmits the G light and reflects the R light, and the dielectric multilayer film 352 transmits the G light and reflects the B light. The cross dichroic prism 350 combines the modulated color light fluxes having exited from the spatial light modulators 340R, 340G, and 340B and impinged on light incident surfaces 350R, 350G, and 350B to form video image light representing a color image and directs the image light to a projection optical unit 360.

The projector 300 thus outputs a video image light L, which is linearly polarized light.

Controller

The controller 400 includes an image signal output section 410 that outputs an image signal to the projector 300 and a screen control section 420 that controls the operation of driving the screen 200 (ON/OFF), as shown in FIG. 1. The projector 300, when it receives the image signal from the image signal output section 410, outputs the video image light L based on the image signal.

The thus configured controller 400 instructs the screen control section 420 to control the operation of driving the screen 200 in response to instructing the image signal output section 410 to output the image signal to the projector 300. Specifically, in a state in which the image signal output section 410 outputs no image signal, the controller 400 instructs the screen control section 420 to drive the screen 200 in the transmission (transparent) state. Conversely, in a state in which the image signal output section 410 outputs the image signal, the controller 400 instructs the screen control section 420 to drive the screen 200 in the scatter state.

The control described above allows the screen 200 to operate in the transparent state when the projector 300 outputs no video image light L, that is, when no image to be displayed on the screen 200 is present. On the other hand, the control described above allows the screen 200 to operate in the scatter state when the projector 300 outputs the video image light L, whereby an image corresponding to the video image light L can be displayed on the screen 200. That is, the simple control described above allows the screen 200 to operate in the transmission state whenever no image is displayed on the screen 200, whereby power can be saved and a feeling of oppression produced in a space where the viewer lives can be reduced.

Further, the controller 400 not only instructs the projector 300 to project the video image light L on the screen 200 but also instructs the screen 200 to change the degree of light scattering in the scatter state in accordance with the luminance level of an image displayed on the screen 200 (image formed by the video image light L). The controller 400 can thus effectively enhance the contrast of the image displayed on the screen 200 by setting the degree of scatter to be suitable for the image. Video images include still pictures and moving pictures, and to display the moving pictures, the degree of scatter is preferably changed to be adequate to the individual pictures on a frame basis. The moving pictures can thus be displayed with the contrast kept uniform throughout the pictures.

It is noted that the degree of scatter can be expressed, for example, in terms of a haze value. The haze value represents the degree of haze (ratio of scattered light to entire transmitted light), and the smaller the haze value, the greater the transmittance (the higher the transparency). The thus defined haze value (%) can be calculated by Td/Tt×100 (Td: diffuse transmittance, Tt: overall light transmittance).

Further, the luminance level of an image displayed on the screen 200 can be expressed by an average of luminance values (grayscales) of pixels in an area used to calculate the luminance level. Assume that "1" represents the luminance of a white pixel, which has the highest luminance, and "0" represents the luminance of a black pixel, which has the lowest luminance. According to the definition, an all-white image has a luminance level of "1", and an all-black image has a luminance level of "0". Further, the luminance level of a black-and-white image and an image containing a chromatic color can be expressed by a value ranging from "0" to "1". A brighter image containing a larger amount of white (or whitish color) has a luminance level closer to "1", whereas a darker image containing a larger amount of black (or blackish color) has a luminance level closer to "0".

The screen control section 420 controls the operation of driving the screen 200 in such a way that the degree of scatter produced by the screen 200 in the scatter state decreases as the luminance level of an image displayed on the screen 200 decreases (approaches zero). The control described above reduces the amount and hence the effect of scattered external light as an image to be displayed becomes dark. As a result, when a dark image is displayed, decrease in contrast of the image can be reduced. On the other hand, when a bright image is displayed, the degree of scatter can be increased to suppress the decrease in contrast of the image. That is, no matter how bright or dark an image to be displayed is, the degree of scatter produced by the screen 200 can be set suitably for the image, whereby the image can be displayed with high contrast.

The screen control section 420 changes the degree of scatter produced by the screen 200 by changing the magnitude of the voltage applied between the transparent electrodes 22 and 23. The screen control section 420 changes the degree of scatter in such a way that the degree of scatter in the scatter state is higher than the degree of scatter in the transmission state. Specifically, let $V_t$ be a voltage applied between the transparent electrodes 22 and 23 to drive the screen 200 to operate in the transmission state (typically 0 V), and let $V_s$ be a voltage applied between the transparent electrodes 22 and 23 to drive the screen 200 to operate in the scatter state, and $V_s$ is set to be greater than $V_t$. Further, let $V_{th}$ be a threshold voltage where the screen 200 starts scattering light, and $V_t$ is set to be smaller than or equal to $V_{th}$ and $V_s$ is set to be greater than $V_{th}$. The setting described above allows an image of a luminance level of "0" to be displayed on the screen 200 that operate in a slight scatter state, whereby an object present behind the screen 200 is not visible, and the visibility and hence the contrast of the displayed image can be increased.

That is, let $V_{max}$ be a voltage applied between the transparent electrodes 22 and 23 to display an image of a luminance level of "1" in the scatter state, and let $V_{min}$ be a voltage applied between the transparent electrodes 22 and 23 to display an image of a luminance level of "0" in the scatter state, and $V_t \leq V_{th} < V_{min} < V_{max}$ is preferably satisfied.

Further, the relationship between the luminance level and the magnitude of the voltage applied between the transparent electrodes 22 and 23 is preferably controlled to be linear, as shown in FIG. 5. In other words, let "x" be the luminance level and "y" be the voltage, and it is preferable to control the relationship in such a way that y is expressed by a linear function of x. As a result, when an image of an arbitrary luminance level is displayed, the voltage application between the transparent electrodes 22 and 23 is readily controlled, while decrease in contrast of the image is effectively reduced.

The voltage may be changed between $V_{min}$ and $V_{max}$ in a continuously variable manner or a stepwise manner in accordance with the luminance level of an image. For example, when an image has a luminance level greater than "0" but smaller than "0.25," the voltage may be set at V1. When an image has a luminance level greater than or equal to "0.25" but smaller than "0.5," the voltage may be set at V2. When an image has a luminance level greater than or equal to "0.5" but smaller than "0.75," the voltage may be set at V3. When an image has a luminance level greater than or equal to "0.75" but smaller than "1," the voltage may be set at V4. In this case, the voltages V1, V2, V3, and V4 satisfy $V_{th} < V_{min} < V1 < V2 < V3 < V4 < V_{max}$.

It is noted that reducing the degree of scatter produced by the screen 200 means increasing the transmittance of the screen 200. When an image of a luminance level of "0" is displayed (when the voltage $V_{min}$ is applied between the transparent electrodes 22 and 23), the transmittance of the screen 200 is not limited to a specific value but is preferably greater than or equal to 50% but smaller than or equal to 70%. Further, when an image of a luminance level of "1" is displayed (when the voltage $V_{max}$ is applied between the transparent electrodes 22 and 23), the transmittance of the screen 200 is not limited to a specific value but is preferably greater than or equal to 0% but smaller than or equal to 20%.

Second Embodiment

An image display system according to a second embodiment of the invention will next be described.

Figure 6:
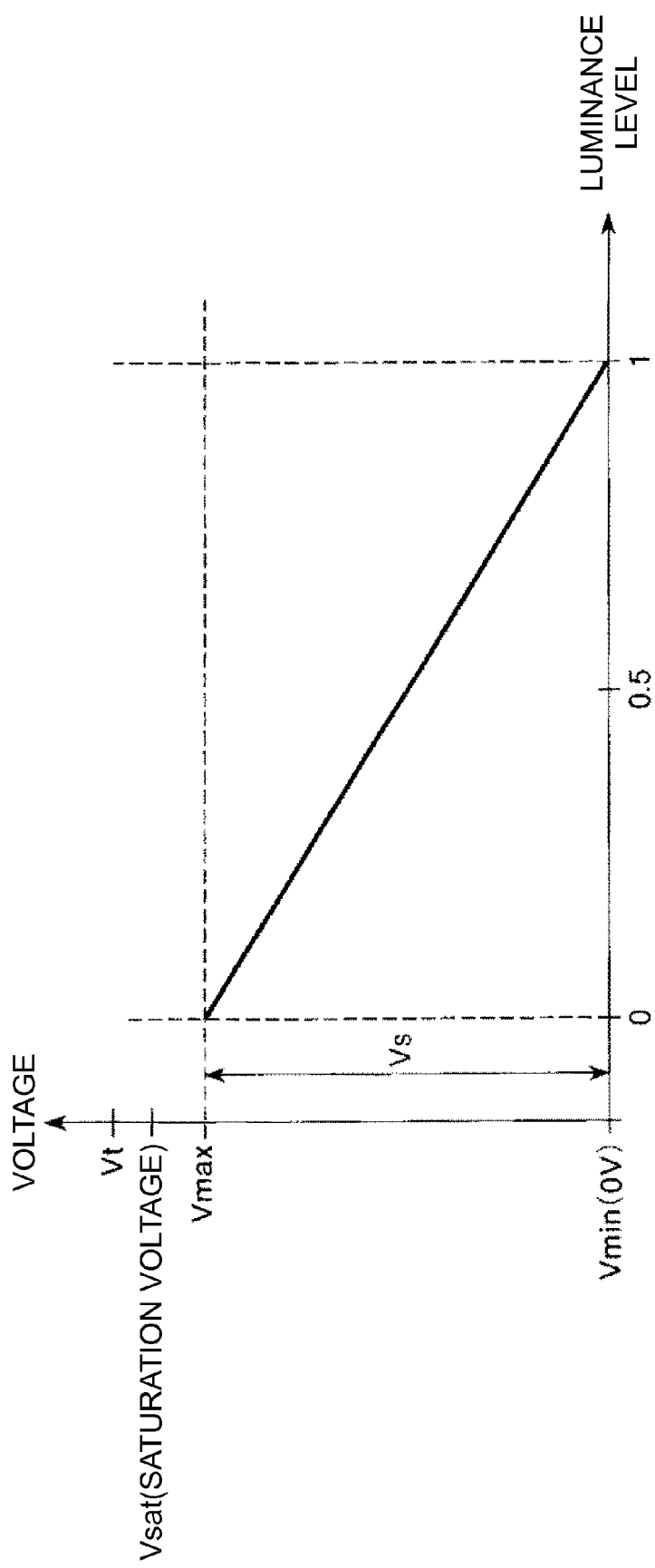
FIG. 6 is a graph showing the relationship between the luminance level of an image displayed on a screen and the magnitude of a voltage applied to the screen in an image display system according to a second embodiment of the invention.

FIG. 6 is a graph showing the relationship between the luminance level of an image displayed on the screen and the magnitude of the voltage applied to the screen in the image display system according to the second embodiment of the invention.

The image display system according to the second embodiment will be described below primarily on differences from the embodiment described above, and similar items will not be described.

The image display system according to the second embodiment of the invention is substantially the same as that according to the first embodiment described above and only differs therefrom in terms of a screen drive mode. The same components as those in the first embodiment described above have the same reference characters.

In the screen 200 according to the present embodiment, the PDLC 261 that forms the liquid crystal layer 26 is of a normal type. The liquid crystal layer 26 therefore operates in the scatter state in the no voltage applied state, whereas operating in the transmission state in the voltage applied state. According to the thus configured screen 200, the scatter state and the transmission state can be readily and reliably switched.

In the thus configured screen 200, the degree of light scattering in the scatter state changes with the magnitude of the voltage applied between the transparent electrodes 22 and 23 and increases as the voltage applied between the transparent electrodes 22 and 23 decreases.

It is noted that the thus configured screen 200 is preferably used in an application in which the period during which an image is displayed on the screen 200 (period during which the screen 200 operates in the scattered state) is longer than the period during which no image is displayed on the screen 200 (period during which the screen 200 operates in the transmission state). The screen 200 can thus be driven in a power-saving mode.

The screen control section 420 controls the operation of driving the screen 200 in such a way that the degree of scatter produced by the screen 200 in the scatter state decreases as the luminance level of an image displayed on the screen 200 decreases (approaches zero).

The screen control section 420 changes the degree of scatter produced by the screen 200 by changing the magnitude of the voltage applied between the transparent electrodes 22 and 23. Specifically, let $V_t$ be a voltage applied between the transparent electrodes 22 and 23 to drive the screen 200 to operate in the transmission state, and let $V_s$ be a voltage applied between the transparent electrodes 22 and 23 to drive the screen 200 to operate in the scatter state, and $V_s$ is set to be smaller than $V_t$. Further, let $V_{sat}$ be a voltage applied between the transparent electrodes 22 and 23 where the transmittance of the screen 200 is maximized and saturated, and $V_t$ is set to be greater than or equal to $V_{sat}$ and $V_s$ is set to be smaller than $V_{sat}$. The setting described above allows an image of a luminance level of "0" to be displayed on the screen 200 that operate in a slight scatter state, whereby an object present behind the screen 200 is not visible, and the visibility and hence the contrast of the displayed image can be increased.

That is, let $V_{min}$ be a voltage applied between the transparent electrodes 22 and 23 to display an image of a luminance level of "1" in the scatter state, and let $V_{max}$ be a voltage applied between the transparent electrodes 22 and 23 to display an image of a luminance level of "0" in the scatter state, and $V_t \geq V_{sat} > V_{max} > V_{min}$ is preferably satisfied.

Further, the relationship between the luminance level and the magnitude of the voltage applied between the transparent electrodes 22 and 23 is preferably controlled to be linear, as shown in FIG. 6. In other words, let "x" be the luminance level and "y" be the voltage, and it is preferable to control the relationship in such a way that y is expressed by a linear function of x. As a result, when an image of arbitrary luminance level is displayed, the voltage application between the transparent electrodes 22 and 23 can be readily controlled, while decrease in contrast of the image can be effectively reduced.

The second embodiment described above also provides the same advantageous effects as those provided by the first embodiment.

Third Embodiment

An image display system according to a third embodiment of the invention will next be described.

Figure 7:
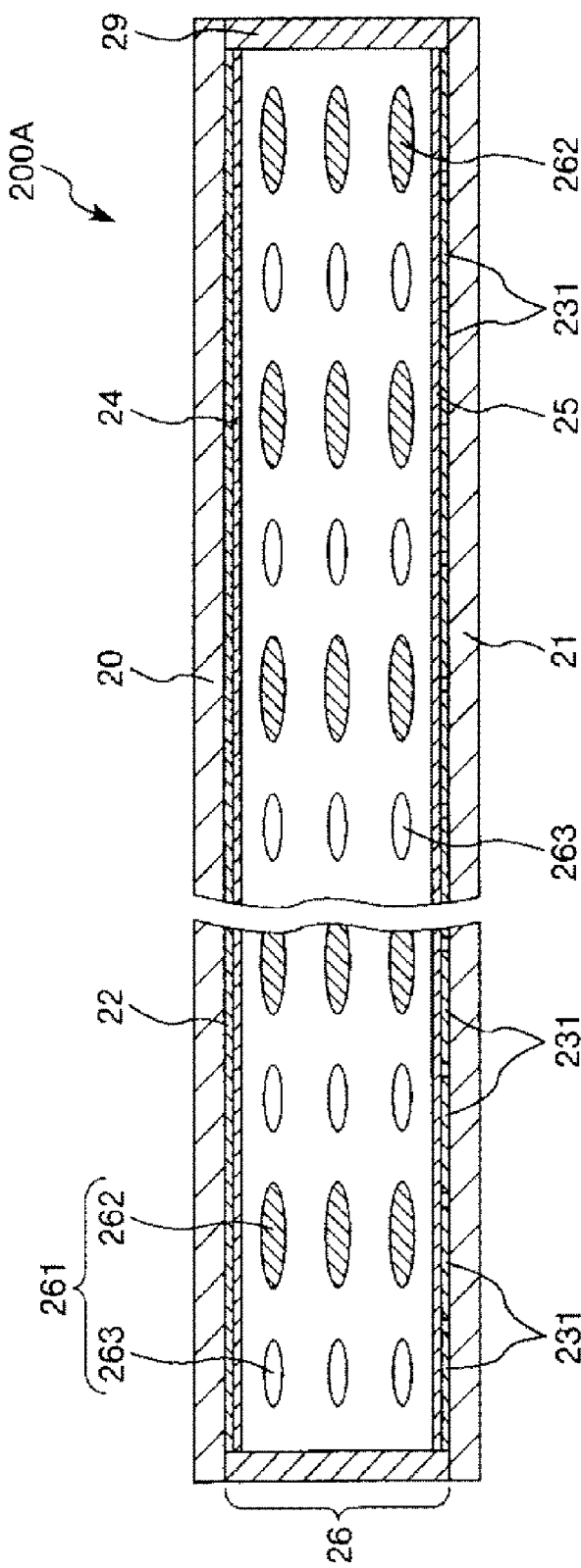
FIG. 7 is a cross-sectional view of a screen that is part of an image display system according to a third embodiment of the invention.
Figure 8:
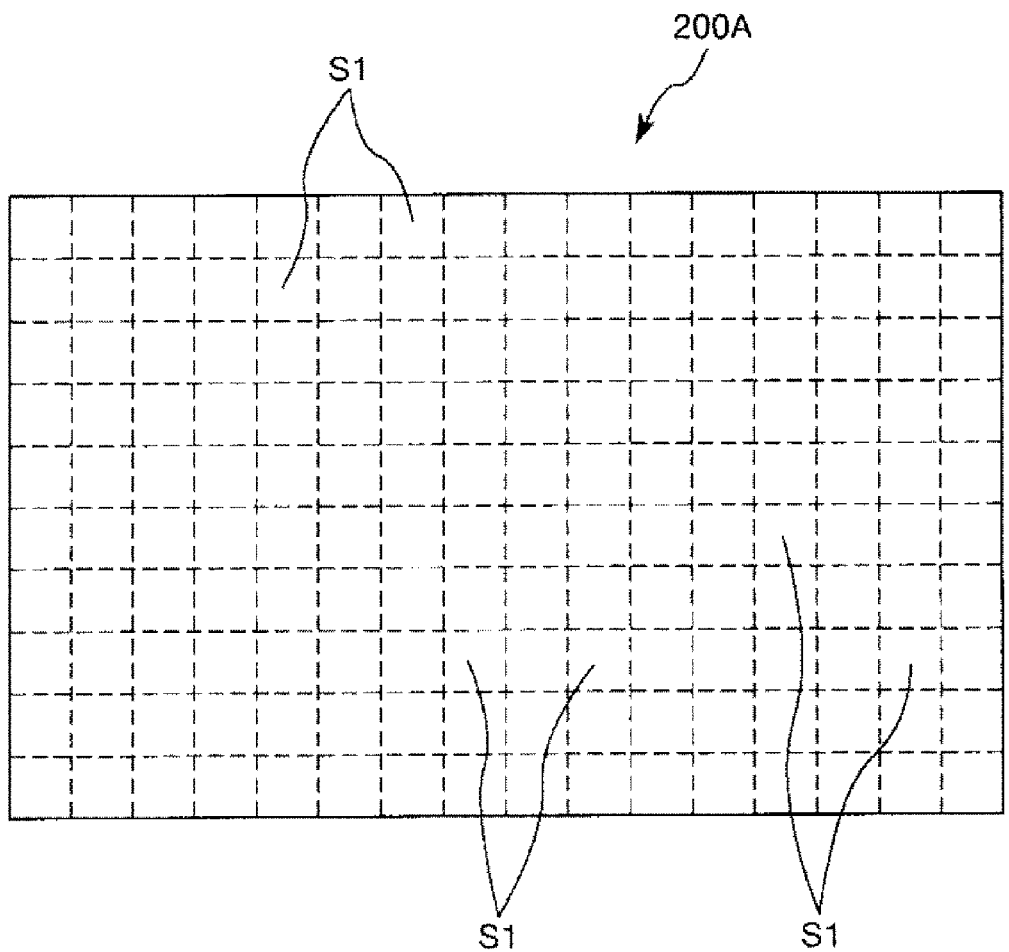
FIG. 8 is a plan view of the screen shown in FIG. 7.
Figure 9:
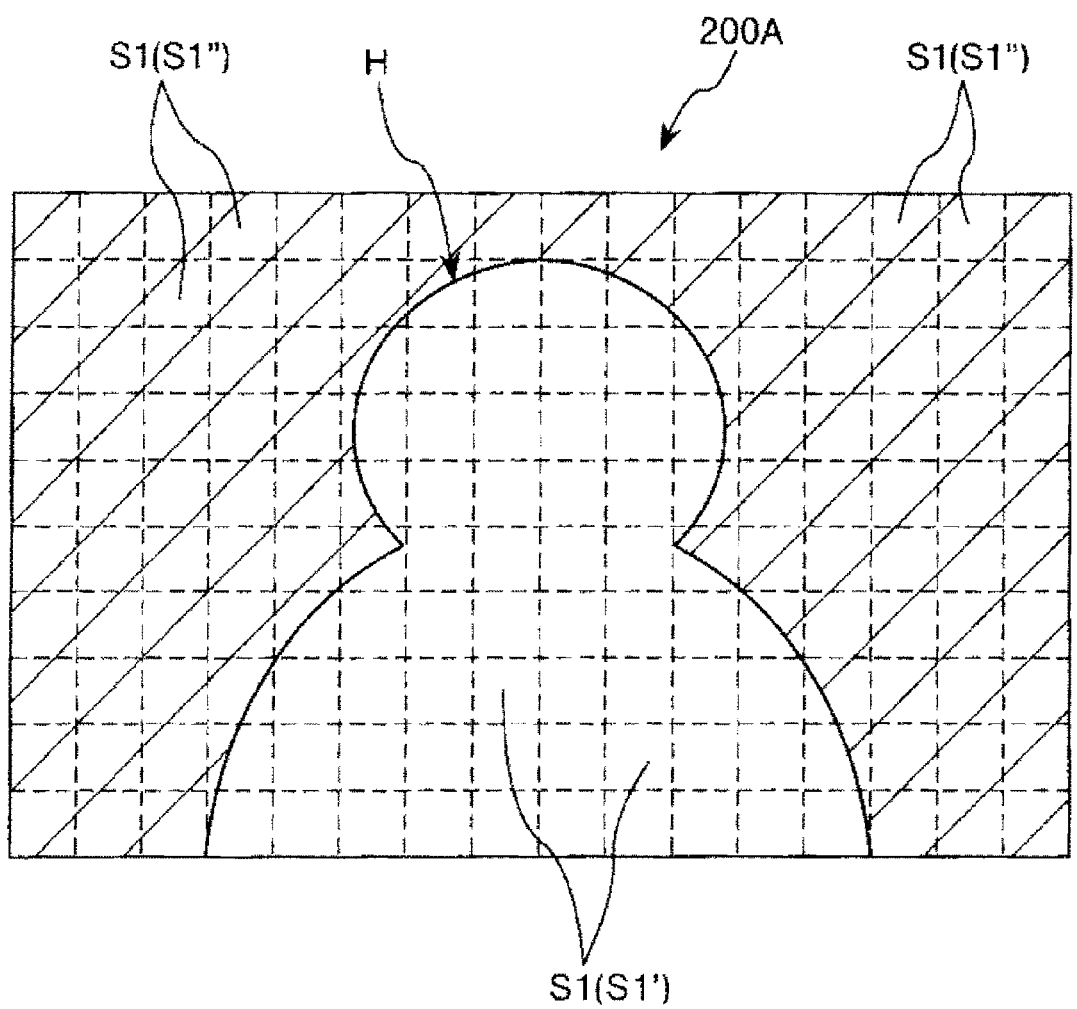
FIG. 9 is a plan view for describing an example of a method for controlling the screen shown in FIG. 7.

FIG. 7 is a cross-sectional view of a screen that is part of the image display system according to the third embodiment of the invention. FIG. 8 is a plan view of the screen shown in FIG. 7. FIG. 9 is a plan view for describing an example of a method for controlling the screen shown in FIG. 7.

The image display system according to the third embodiment will be described below primarily on differences from the embodiments described above, and similar items will not be described.

The image display system according to the third embodiment of the invention is substantially the same as that according to the first embodiment described above and only differs therefrom in terms of configuration of the screen and control method used in the controller. The same components as those in the first embodiment described above have the same reference characters.

In a screen 200A according to the present embodiment, the transparent electrode 23 is divided into a plurality of portions, as shown in FIGS. 7 and 8. In other words, a plurality of transparent electrode pieces 231 are formed on the transparent substrate 21. The plurality of transparent electrode pieces 231 are arranged in a matrix and connected to a circuit (not shown) formed on a transparent substrate (not shown). The circuit includes, for example, TFTs (switching devices) arranged in a matrix, gate lines and data lines formed in correspondence with the TFTs, a gate driver that applies a desired voltage to each of the gate lines, and a data driver that applies a desired voltage to each of the data lines. In the screen 200A, voltage application to the transparent electrode pieces 231 can therefore be controlled independently of each other. In the following description, an area where each of the transparent electrode pieces 231 overlaps with the transparent electrode 22 is called a "unit area S1" for convenience of description.

The size of the unit area S1 (that is, the size of each of the transparent electrode pieces 231) in a plan view of the screen 200A is not limited to a specific value but preferably ranges from about 1×1 to 10×10 cm.

The controller 400 (the screen control section 420) can change the degree of scatter in the scatter state in the plurality of unit areas S1 independently of each other. Specifically, the screen control section 420 controls the operation of driving the screen 200A in such a way that the degree of scatter in each of the unit areas S1 in the scatter state decreases as the luminance level of an image displayed in the unit area S1 decreases (approaches zero).

Some images displayed on the screen 200A have bright portions (areas where the luminance level is close to "1") and dark portions (areas where the luminance level is close to "0") mixed therein. According to the present embodiment, the degree of scatter can be controlled on a unit area S1 basis. When the image having the bright portions and the dark portions mixed therein is displayed as described above, the contrast of the displayed image can therefore be increased by increasing the degree of scatter in the unit areas S1 corresponding to the bright portions and reducing the degree of scatter in the unit areas S1 corresponding to the dark portions.

A description will be made of the above operation with reference to a specific example. When a photographic image in which a person H is imaged against a dark background is displayed as shown in FIG. 9, the degree of scatter is increased in the unit areas S1 (S1') located within the person H, which is a relatively bright portion, and the degree of scatter is reduced in the unit areas S1 (S1") located within the background, which is a relatively dark portion. As a result, the bright portion becomes brighter, and the dark portion becomes darker, whereby the contrast of the photographic image displayed on the screen 200A can be increased.

A method for controlling the degree of scatter in each of the unit areas S1 is the same as that in the first embodiment described above, and no description thereof will be therefore made.

The third embodiment described above also provides the same advantageous effects as those provided by the first embodiment.

Fourth Embodiment

An image display system according to a fourth embodiment of the invention will next be described.

Figure 10:
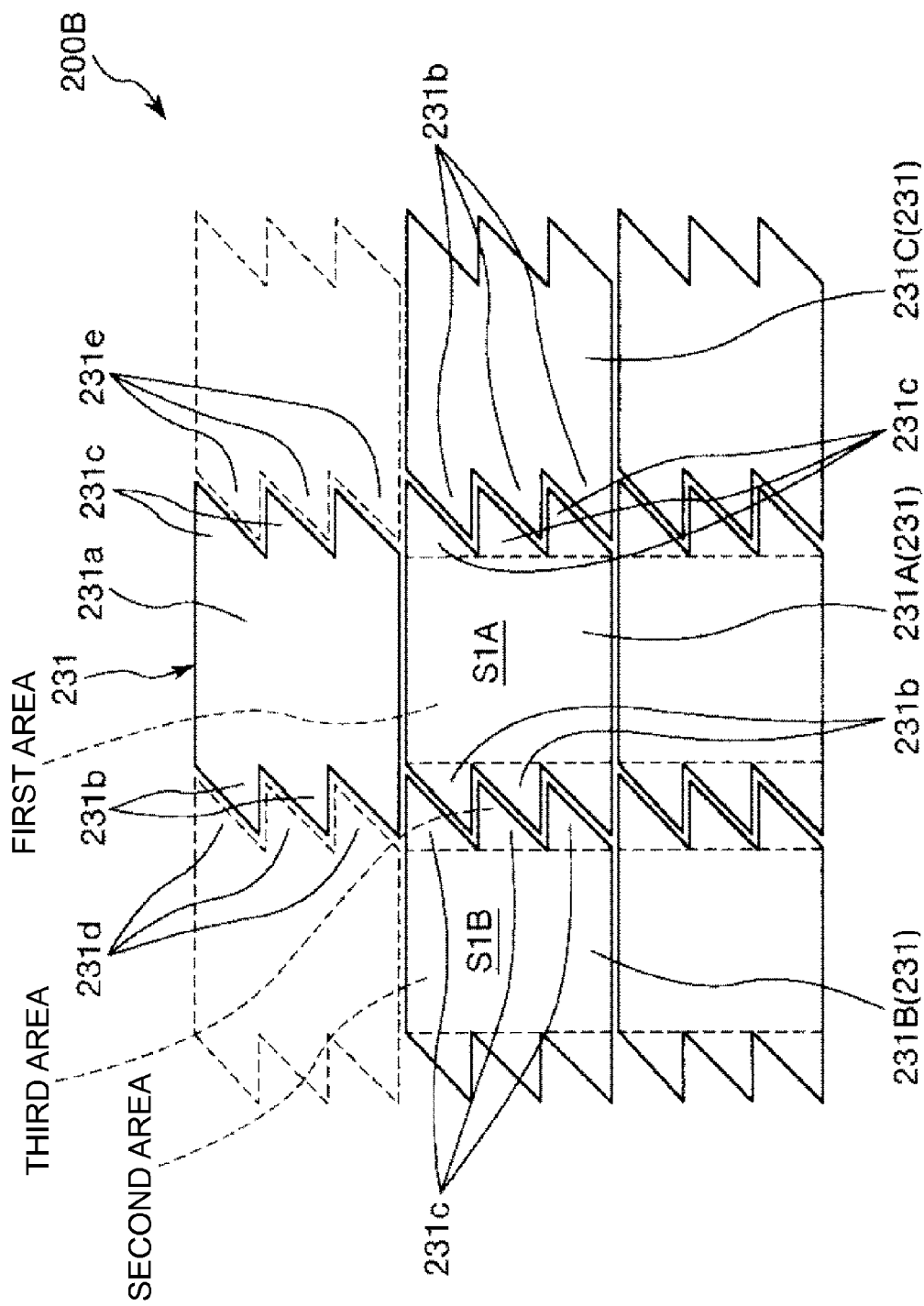
FIG. 10 is a plan view showing transparent electrode pieces of a screen that is part of an image display system according to a fourth embodiment of the invention.
Figure 11:
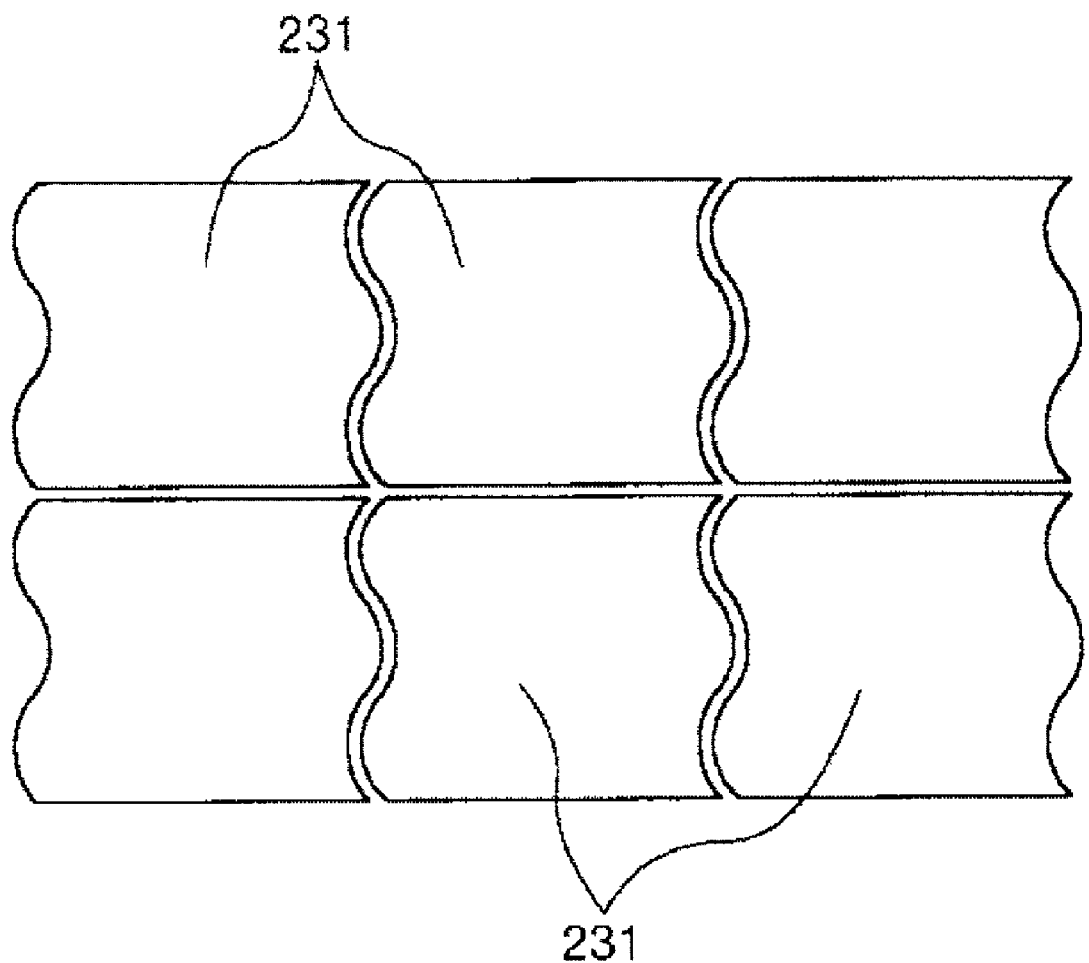
FIG. 11 is a plan view showing a variation of the transparent electrode pieces shown in FIG. 10.

FIG. 10 is a plan view showing transparent electrode pieces of a screen that is part of the image display system according to the fourth embodiment of the invention. FIG. 11 is a plan view showing a variation of the transparent electrode pieces shown in FIG. 10.

The image display system according to the fourth embodiment will be described below primarily on differences from the embodiments described above, and similar items will not be described.

The image display system according to the fourth embodiment of the invention is substantially the same as that according to the third embodiment described above and only differs therefrom in terms of the shape of the transparent electrode pieces of the screen. The same components as those in the third embodiment described above have the same reference characters.

In a screen 200B according to the present embodiment, a plurality of transparent electrode pieces 231 are so formed that those adjacent to each other in the transverse direction engage with each other like gears, as shown in FIG. 10. Specifically, each of the transparent electrode pieces 231 has a base 231a, a plurality of protrusions 231b that protrude leftward (on one side) from the base 231a, and a plurality of protrusions 231c that protrude rightward (on the other side) from the base 231a.

The protrusions 231b and 231c have the same shape (and the same size), and each of them has a width that decreases toward the tip. In the present embodiment, the protrusions 231b and 231c each have a substantially right triangular shape and are arranged to form sawteeth. Further, a recess 231d formed between a pair of adjacent protrusions 231b has a shape corresponding to (has substantially the same shape as) the protrusion 231c that faces the recess 231d, and a recess 231e formed between a pair of adjacent protrusions 231c has a shape corresponding to (has substantially the same shape as) the protrusion 231b that faces the recess 231e.

A description will now be made of transparent electrode pieces 231A and 231B adjacent to each other. They are so disposed that the protrusions 231b of the transparent electrode piece 231A engage with the protrusions 231c of the transparent electrode piece 231B. In other words, they are so disposed that the protrusions 231b of the transparent electrode piece 231A fill the recesses 231e of the transparent electrode piece 231B. A similar description will be made of the transparent electrode piece 231A and a transparent electrode piece 231C adjacent to each other. They are so disposed that the protrusions 231c of the transparent electrode piece 231A engage with the protrusion 231b of the transparent electrode piece 231C. In other words, they are so disposed that the protrusions 231c of the transparent electrode piece 231A fill the recesses 231d of the transparent electrode piece 231C.

The thus shaped and disposed transparent electrode pieces 231 provide the following advantageous effect: For example, when the degree of scatter in a unit area S1A corresponding to the transparent electrode piece 231A differs from the degree of scatter in a unit area S1B corresponding to the transparent electrode piece 231B, an image displayed in the unit area S1A may differ from an image displayed in the unit area S1B in terms of brightness in accordance with the difference in the degree of scatter in some cases. When there is a difference in brightness between the unit areas S1A and S1B as described above, the brightness unnaturally (abruptly) changes at the boundary between the unit areas S1A and S1B. In this case, the image displayed on the screen 200B can be an unnatural image in which the color thereof does not smoothly changes.

To address the problem, in the present embodiment, the transparent electrode pieces 231A and 231B adjacent to each other are configured to engage with each other so that the brightness of an image is continuously changed by gradation at the boundary between the unit areas S1A and S1B, whereby a natural image in which the color thereof smoothly changes can be displayed on the screen 200B.

In particular, since there are a first area where only the transparent electrode piece 231A is present (area corresponding to the base 231a of the transparent electrode piece 231A) and a second area where only the transparent electrode piece 231B is present (area corresponding to the base 231a of the transparent electrode piece 231B) in the transverse direction in FIG. 10 (direction in which the transparent electrode pieces 231A and 231B are arranged) in the present embodiment, a high-contrast image can be displayed in each of the unit areas S1A and S1B.

Further, in a third area present between the transparent electrode pieces 231A and 231B, where both the transparent electrode pieces 231A and 231B are present, (area between the base 231a of the transparent electrode piece 231A and the base 231a of the transparent electrode piece 231B), the occupancy rate of the transparent electrode piece 231A gradually decreases and the occupancy rate of the transparent electrode piece 231B gradually increases from the side where the transparent electrode piece 231A is present toward the side where the transparent electrode piece 231B is present. As a result, the brightness of the image can be continuously changed in a more effectively manner at the boundary between the unit areas S1A and S1B, whereby a natural image in which the color thereof changes more smoothly can be displayed on the screen 200B.

The fourth embodiment described above also provides the same advantageous effects as those provided by the first embodiment.

The shape of each of the protrusions 231b and 231c is not limited to a specific one, and the contour of the shape can alternatively be formed, for example, of a curve as shown in FIG. 11.

The image display systems according to the embodiments of the invention have been described above with reference to the drawings, but the invention it not limited thereto. The configuration of each of the components can be replaced with an arbitrary configuration having the same function. Further, other arbitrary components may be added to the invention. Moreover, the embodiments may be combined with each other as appropriate.

The entire disclosure of Japanese Patent Application No. 2011-218330, filed Sep. 30, 2011 is expressly incorporated by reference herein.

What is claimed is:

1. An image display system comprising: a screen capable of switching a state thereof between a scatter state in which the screen scatters light and a transmission state in which the screen transmits light by changing the magnitude of a voltage applied to the screen; a projector that projects video image light modulated in accordance with an image signal on the screen to display an image on the screen; and a controller that controls operation of driving the screen and the projector, wherein the controller instructs the projector to project the video image light on the screen that operates in the scatter state and instructs the screen to change the degree of light scattering in the scatter state in accordance with a luminance level of the image displayed on the screen, and wherein the controller causes the screen to reduce the degree of light scattering in the scatter state as the luminance level of the image displayed on the screen decreases.

2. The image display system according to claim 1,
wherein the controller changes the degree of light scattering in such a way that the degree of light scattering in the scatter state is higher than the degree of light scattering in the transmission state.

3. The image display system according to claim 1,
wherein the screen has a display area where the image is displayed and the display area is formed of a plurality of unit areas, and
the controller is capable of changing the degree of scatter in the scatter state in the plurality of unit areas independently of each other.

4. The image display system according to claim 1,
wherein the screen includes a pair of substrates and a polymer dispersion liquid crystal layer provided between the pair of substrates and having liquid crystal molecules dispersed in a polymer.

5. The image display system according to claim 1, wherein the screen to which the voltage is applied operates in the scatter state, whereas the screen to which no voltage is applied operates in the transmission state.

6. The image display system according to claim 1,
wherein the screen to which the voltage is applied operates in the transmission state, whereas the screen to which no voltage is applied operates in the scatter state.

7. The image display system according to claim 1,
wherein the controller instructs the screen to operate in the scatter state in response to outputting the image signal to the projector.

8. The image display system according to claim 2,
wherein the screen includes a pair of substrates and a polymer dispersion liquid crystal layer provided between the pair of substrates and having liquid crystal molecules dispersed in a polymer.

9. The image display system according to claim 2,
wherein the controller instructs the screen to operate in the scatter state in response to outputting the image signal to the projector.

10. The image display system according to claim 3,
wherein the screen includes a pair of substrates and a polymer dispersion liquid crystal layer provided between the pair of substrates and having liquid crystal molecules dispersed in a polymer.

11. The image display system according to claim 3, wherein the controller instructs the screen to operate in the scatter state in response to outputting the image signal to the projector.

12. The image display system according to claim 4, wherein the controller instructs the screen to operate in the scatter state in response to outputting the image signal to the projector.

13. The image display system according to claim 5, wherein the screen includes a pair of substrates and a polymer dispersion liquid crystal layer provided between the pair of substrates and having liquid crystal molecules dispersed in a polymer.

14. The image display system according to claim 5, wherein the controller instructs the screen to operate in the scatter state in response to outputting the image signal to the projector.

15. The image display system according to claim 6, wherein the screen includes a pair of substrates and a polymer dispersion liquid crystal layer provided between the pair of substrates and having liquid crystal molecules dispersed in a polymer.

16. The image display system according to claim 6, wherein the controller instructs the screen to operate in the scatter state in response to outputting the image signal to the projector.

17. A control apparatus that controls operation of driving a screen capable of switching a state thereof between a scatter state in which the screen scatters light and a transmission state in which the screen transmits light by changing the magnitude of a voltage applied to the screen and operation of driving a projector that projects video image light modulated in accordance with an image signal on the screen to display an image on the screen, wherein the control apparatus instructs the projector to project the video image light on the screen that operates in the scatter state and instructs the screen to change the degree of light scattering in the scatter state in accordance with a luminance level of the image displayed on the screen, and wherein the controller causes the screen to reduce the degree of light scattering in the scatter state as the luminance level of the image displayed on the screen decreases.

* * * * *